(12) United States Patent
Morillo Martín et al.

(10) Patent No.: US 11,458,697 B2
(45) Date of Patent: Oct. 4, 2022

(54) METHOD FOR POLISHING POLYAMIDE OBJECTS OBTAINED BY ADDITIVE MANUFACTURING OR 3D PRINTING TECHNIQUES

(71) Applicant: ACONDICIONAMIENTO TARRASENSE, Terrassa (ES)

(72) Inventors: Diego Morillo Martín, Terrassa (ES); David Amantia, Terrassa (ES); Mirko Faccini, Terrassa (ES); Oscar Alonso Almirall, Terrassa (ES); Magí Galindo Anguera, Terrassa (ES); Laurent Aubouy, Terrassa (ES)

(73) Assignee: Acondicionamiento Tarrasense, Terrassa (ES)

( * ) Notice: Subject to any disclaimer, the term of this patent is extended or adjusted under 35 U.S.C. 154(b) by 631 days.

(21) Appl. No.: 16/340,809

(22) PCT Filed: Oct. 9, 2017

(86) PCT No.: PCT/EP2017/075685
§ 371 (c)(1),
(2) Date: Apr. 10, 2019

(87) PCT Pub. No.: WO2018/069250
PCT Pub. Date: Apr. 19, 2018

(65) Prior Publication Data
US 2020/0331217 A1    Oct. 22, 2020

(30) Foreign Application Priority Data
Oct. 10, 2016 (EP) .................................. 16382461

(51) Int. Cl.
*B29C 71/00* (2006.01)
*B29C 64/153* (2017.01)
(Continued)

(52) U.S. Cl.
CPC ........ *B29C 71/0009* (2013.01); *B29C 64/153* (2017.08); *B29C 64/35* (2017.08);
(Continued)

(58) Field of Classification Search
CPC .................................................. B29C 71/0009
See application file for complete search history.

(56) References Cited

U.S. PATENT DOCUMENTS

| | | | |
|---|---|---|---|
| 2,572,719 A * | 10/1951 | Ginell ........................ | C08J 7/02 156/1 |
| 5,484,565 A * | 1/1996 | Larsen ........................ | C08J 3/18 264/343 |

(Continued)

FOREIGN PATENT DOCUMENTS

WO     2003/089218 A1     10/2003
WO     2008/088761 A1     7/2008
(Continued)

OTHER PUBLICATIONS

Behler, New solvent for polyamides and its application to the electrospinning of polyamides 11 and 12, 2007, Polymer, 48, 6617-6621 (Year: 2007).*

(Continued)

*Primary Examiner* — Timothy Kennedy
(74) *Attorney, Agent, or Firm* — Thomas E. Lees, LLC

(57) ABSTRACT

The present invention refers to a method for polishing polyamide objects obtained by additive manufacturing or 3D printing techniques, which comprises immersion of the polyamide object in a mixture of formic acid and dichloromethane at room temperature for a period of time comprised between 5 seconds and 6 minutes. This method allows effectively elimination or reduction of the roughness of the polyamide objects obtained by additive manufacturing or 3D printing techniques, for example, obtained by techniques (Continued)

such as the Selective Laser Sintering (SLS) with a simple procedure which does not require neither high temperatures nor extended treatment times. The present invention also refers to the object obtainable according to such method.

15 Claims, 2 Drawing Sheets

(51) Int. Cl.

| | | |
|---|---|---|
| *B29C 64/35* | (2017.01) | |
| *B33Y 40/20* | (2020.01) | |
| *B29C 71/02* | (2006.01) | |
| *B29C 71/04* | (2006.01) | |
| *B33Y 10/00* | (2015.01) | |
| *B29K 77/00* | (2006.01) | |

(52) U.S. Cl.
CPC .............. *B29C 71/02* (2013.01); *B29C 71/04* (2013.01); *B33Y 40/20* (2020.01); *B29C 2071/0018* (2013.01); *B29K 2077/00* (2013.01); *B29K 2995/0073* (2013.01); *B33Y 10/00* (2014.12)

(56) References Cited

U.S. PATENT DOCUMENTS

| | | | | |
|---|---|---|---|---|
| 8,075,300 B2* | 12/2011 | Zinniel | ................... | B29C 64/30 |
| | | | | 38/77.8 |
| 8,765,045 B2* | 7/2014 | Zinniel | ................. | B33Y 40/00 |
| | | | | 264/341 |
| 2019/0039290 A1* | 2/2019 | Lebrun | ................. | B33Y 70/00 |

FOREIGN PATENT DOCUMENTS

| | | |
|---|---|---|
| WO | 2011/145960 A1 | 11/2011 |
| WO | 2014/203254 A1 | 12/2014 |

OTHER PUBLICATIONS

International Search Report for PCT Application No. PCT/EP2017/075685, European Patent Office; Rijswijk, Netherlands; dated Jan. 18, 2018.
Written Opinion of the International Searching Authority for PCT Application No. PCT/EP2017/075685, European Patent Office; Rijswijk, Netherlands; dated Jan. 18, 2018.

\* cited by examiner

METHOD FOR POLISHING POLYAMIDE OBJECTS OBTAINED BY ADDITIVE MANUFACTURING OR 3D PRINTING TECHNIQUES

CROSS-REFERENCE TO RELATED APPLICATIONS

This is a § 371 National Stage Entry application of International Application Serial No. PCT/EP2017/075685, filed on Oct. 9, 2017, which claims the benefit of European Patent Application No. 16382461.8, filed on Oct. 10, 2016, the disclosures of which are hereby incorporated by reference.

FIELD OF THE INVENTION

The present invention refers to the objects produced by additive manufacturing or 3D printing techniques, and more specifically refers to a method for polishing the surface of the polyamide objects produced by the mentioned technology.

BACKGROUND

The additive manufacturing technology or 3D printing, also called rapid manufacturing or rapid prototyping, comprises a large variety of procedures for obtaining three-dimensional pieces, using various materials, from models or digital prototypes created with CAD programs (Computer Aided Design). In general, these procedures are based on dividing the digital representation of the objects in different horizontal sections, and then building the object automatically, layer by layer, by repetitive application of the materials.

Among the different specific techniques that are included within the generic name of additive manufacturing or 3D printing, for example, Selective Laser Sintering (SLS), or Fused Deposition Modeling (FDM) can be mentioned.

In the SLS the laser is used to sinter powder materials, causing the fusion of the particles and solidification at selected points, thereby forming the three dimensional object. In the FDM technique, the object is formed by the deposition, layer by layer, of a melted polymer on a support structure.

This technology enables the economical and versatile manufacture of objects and prototypes of different materials based on a virtual model, which has industrial applications in very diverse sectors. Objects made of plastic materials, mainly ABS (acrylonitrile butadiene styrene) and polyamides, are usually produced using this technique A characteristic of this production technology is that the obtained objects usually do not have a perfectly smooth surface, but often their surface is rough, porous or has a stair-step appearance.

In general, it is desirable to remove imperfections of the objects surface to improve not only their aesthetic appearance, but also its functionality and resistance.

To this end, various strategies are used for polishing the objects obtained by additive manufacturing or 3D printing techniques. A possible type of treatment is a purely mechanical polishing, typically by treatment with abrasive materials.

It has also been disclosed in the state-of-the-art, the treatment with certain chemical substances to achieve the smoothing or polishing of the surface of the pieces, according to what is commonly known as chemical polishing.

Thus, for example, in the international patent application WO-A-03/089218 it is disclosed the use of solvents for the polishing of the surface of plastic objects produced by additive manufacturing techniques, so that the objects are treated with a solvent in vapour form, to thereby fluidize the object surface, and subsequently are dried. The solvents used can be dichloromethane, n-propyl bromide or perchlorethylene.

In the international patent application WO-A-2008/088761 it is disclosed a procedure for the smoothing of objects produced by additive manufacturing technologies or 3D printing consisting in the combination of a chemical polishing and a mechanical polishing. The chemical polishing can be accomplished with various solvents, by immersion or by treatment with their vapors. For example, an object made of ABS is treated with n-propyl bromide vapors and then it is blasted with sodium bicarbonate powder.

In the international patent application WO-A-2011/145960 a procedure is described for the polishing of the surface of polyamide prototypes manufactured according to a SLS technology which comprises subjecting the object to vapors of a chemical product selected from formic acid, acetic acid, m-cresol and acetic anhydride, for a period of time between 1 and 350 seconds.

In the international patent application WO-A-2014/203254, a method for polishing the surfaces of objects made of polymeric materials by additive manufacturing techniques is described, which involves immersion of the object in a bath of a given solvent, at a certain temperature, to achieve a partial dissolution of the surface of the object to create a gel layer, and subsequent heat curing. The selection of the specific solvent and the treatment conditions depends on the type of polymer. Specifically, a process for polishing objects made with a polyamide (Nylon 12) is described, comprising a first step of immersing the object in a 1:1 mixture of acetic acid and formic acid at 70-80° C., for between 3-10 minutes, and a later step of heat curing from an initial temperature of 30° C. to a final temperature of 120-130° C., applying an increment of 1° C./minute and maintaining such temperature for 3-4 hours.

In general, the methods described in the prior art are either not effective for polishing specifically pieces made of polyamides, or they require the use of vapors, or prolonged treatments with solvents at elevated temperatures.

Therefore, there remains a need for new methods for polishing the surface of objects obtained by additive manufacturing or 3D printing techniques, particularly for objects made of polyamides, which are effective and fast, and which do not require neither the use of vapors nor the treatment at elevated temperatures.

SUMMARY

One aspect of the present invention is a method for polishing the surface of polyamide objects.

Another aspect of the invention is an object obtainable by such method.

BRIEF DESCRIPTION OF THE SEVERAL VIEWS OF THE DRAWINGS

FIG. 1 is a diagram of the polyamide pieces used in the polishing tests of the examples, wherein the dimensions and the shape of the pieces used are shown, each divided into four parts to carry out the tests, as shown by the dashed line.

FIG. 2 is a perspective view of a pipe-shaped polyamide piece (obtained by MJF) which will be polished by carrying out the chemical polishing process according to the invention, with and without ultrasonic treatment. In the perspective view, the four points (1, 2, 3, 4) are the points were surface roughness measurements were taken before and after the ultrasound treatment. The measurements were made in the contour of the pipe-shaped piece.

FIG. 3 is a perspective view of a nut-shaped polyamide piece (obtained by MJF) which will be polished by carrying out the chemical polishing process according to the invention, with and without ultrasonic treatment. Various positions of the surface were selected for roughness measurements before and after the treatment. To perform the surface roughness measurements, the face indicated by the arrow is used as a reference and a measurement is made, counter clockwise, on each of the other faces of the nut.

DETAILED DESCRIPTION

Figure 1:
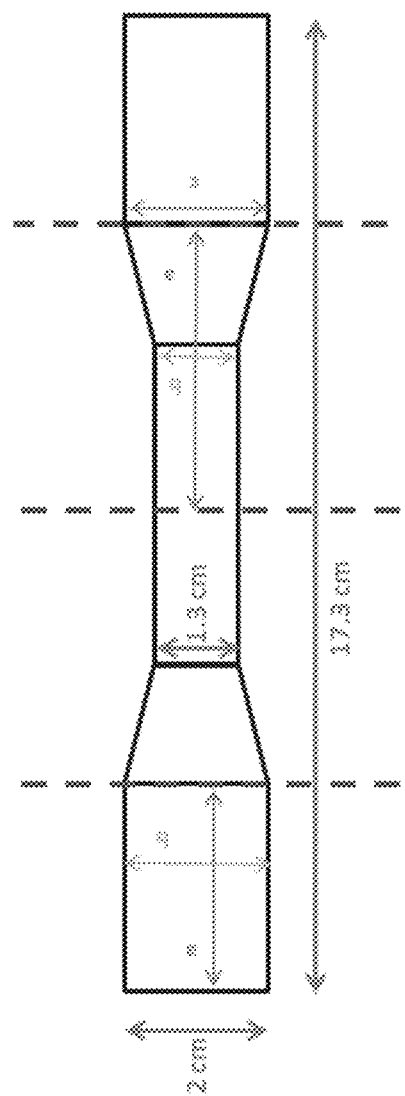
FIG. 1
Figure 2:
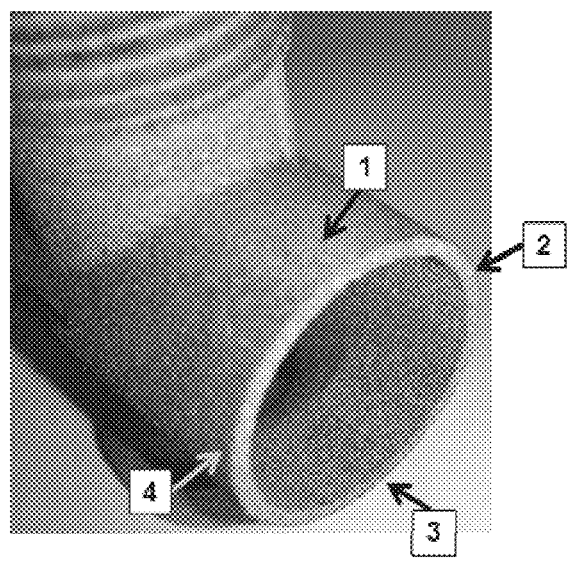
FIG. 2
Figure 3:
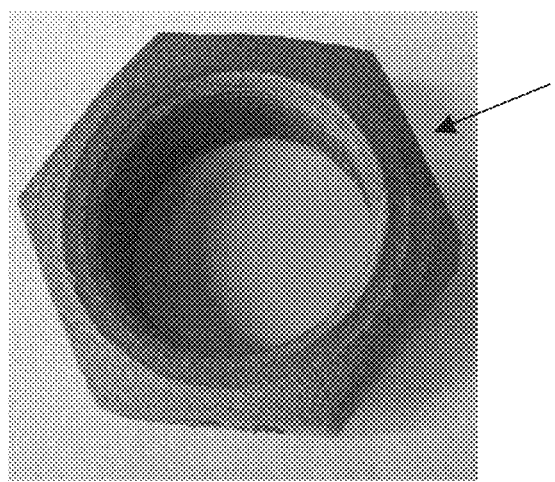
FIG. 3

The object of the present invention is a method for polishing the surface of polyamide object obtained by additive manufacturing or 3D printing techniques comprising the immersion of the object in a mixture of formic acid and dichloromethane at room temperature for a period of time comprised between 5 seconds and 6 minutes, wherein the ratio of formic acid:dichloromethane by volume is comprised between 1:10 and 3:1.

The authors of the present invention have developed a method for polishing polyamide pieces based on the combination of formic acid and dichloromethane according to a specific ratio which, surprisingly, is highly effective and requires a simple treatment of short duration at room temperature. This method is particularly effective for polishing polyamide pieces obtained by additive manufacturing or 3D printing techniques, especially those obtained by Selective Laser Sintering (SLS) and Multi Jet Fusion (MJF, Hewlett-Packard).

Throughout the present description and the claims, the terms in singular, usually preceded by the articles "a" or "the", include also the reference to plural, unless the context clearly indicates otherwise. The term "approximately" referred to a certain magnitude indicates that a variation of ±10% in such magnitude is allowed.

Additive Manufacturing or 3D Printing Techniques

Within the meaning of the present invention, the expression "additive manufacturing or 3D printing techniques" includes any additive manufacturing technique, by layers, or 3D printing, as are well known by the skilled in the art, and which are based on the manufacturing, layer by layer, of three-dimensional objects from digital representations of the objects.

Thus, the polishing method of the present invention can be applied, in general, for polishing polyamide objects obtained by any additive manufacturing technology.

Among the different specific techniques encompassed by the generic term of additive manufacturing or 3D printing which are included within the scope of the present invention, are those based on the fusion of materials in a powder bed (Powder Bed Fusion), as the Selective Laser Sintering (SLS) or the Multi Jet Fusion (MJF, Hewlett-Packard), or those based on the extrusion of materials such as Fused Deposition Modelling (FDM).

In the Selective Laser Sintering (SLS), laser is used to sinter powder material, causing the fusion of the particles and the solidification, layer by layer, at the selected points thereby forming the three-dimensional object.

In the MJF (Hewlett-Packard) technique the deposition of the powder material is combined with the injection of other chemical substances that are selectively applied to control the formation of the 3D object ("fusing agent" and "detailing agent"), and energy is applied over the entire surface, repeating the process layer by layer, until the object is formed.

In the FDM technique, the object is formed by deposition, layer by layer, of the melted polymer on a support structure.

In one embodiment of the invention, the object susceptible to being polished with the method of the present invention is obtained by an additive manufacturing or 3D printing technique selected from the Selective Laser Sintering (SLS) and Fused Deposition Modelling (FDM).

In a particularly preferred embodiment, the object to be polished with the method of the present invention is obtained by Selective Laser Sintering (SLS).

Polyamides

The method of the present invention is specifically intended to polishing polyamide pieces.

Within the meaning of the present invention, polyamides, also commonly referred to by the term "nylon", refer to a type of synthetic thermoplastic polymers wherein the amide functional group (—CO—NH—) is repeated.

Polyamides can be obtained by different methods, for example, by the reaction of diamines with dicarboxylic acids, by self-condensation of ω-amino acids, by opening of the lactams ring or by reacting diamines with diacid chlorides. Many polyamides of industrial interest are commercially available.

Among the main polyamides of industrial interest as thermoplastic polymers, the following can be highlighted: polyamide 6, polyamide 6.6, polyamide 6.9, polyamide 6.10, polyamide 6.12, polyamide 4.6, polyamide 11, and polyamide 12, among others.

In general, the polyamides referred by a sole number (polyamides 6, 11 or 12, for example) denote their preparation from a ω-amino acid or a lactam, while polyamides identified by two numbers (polyamides 4.6, 6.6, 6.9, 6.10 or 6.12, for example) denote their preparation from a diamine and a dicarboxylic acid and the first and the second figure indicate, respectively, the number of carbon atoms of the amine and the acid.

Thus, polyamide 6.6, also known as nylon 6.6 or PA6.6, refers to the poly(hexamethylene adipamide), which is usually prepared by polycondensation of hexamethylenediamine and adipic acid, and can be represented by the following formula: $(NH-(CH_2)_6-NH-CO-(CH_2)_4-CO)_n$.

Analogously, polyamides 6.9 ($(NH-(CH_2)_6-NH-CO-(CH_2)_7-CO)_n$), 6.10 ($(NH-(CH_2)_6-NH-CO-(CH_2)_8-CO)_n$) and 6.12 ($(NH-(CH_2)_6-NH-CO-(CH_2)_{10}-CO)_n$) are prepared by polycondensation of hexamethylenediamine and azelaic acid, sebacic acid and dodecanedioic acid, respectively.

The polyamide 4.6, or nylon 4.6, can be prepared by reaction of 1,4-diaminobutane and adipic acid, and can be represented by the formula $(NH-(CH_2)_4-NH-CO-(CH_2)_4-CO)_n$.

The polyamide 6, also called nylon 6, or PA6, refers to polycaprolactam, and can be represented by the formula $(NH-(CH_2)_5-CO)_n$.

The polyamide 11, also known as nylon 11 or PA 11, is usually prepared by polymerization of the 11-aminoundecanoic acid, and can be represented by the formula $(NH-(CH_2)_{10}-CO)_n$.

The polyamide 12, also known as nylon 12, PA12 or poly(laurolactam), can be prepared by condensation of the 12-aminododecanoic acid or the 12-aminododecanolactam (laurolactam), and can be represented by the formula $(NH-(CH_2)_{11}-CO)_n$.

The copolymers of the above polyamides can also be used, for example, the polyamide 6.6/6.10 (or PA 66/610) indicates a copolymer containing polyamide 6.6 and polyamide 6.10, or the polyamide copolymer 6/6.6 (or PA 6/66) indicates a copolymer containing polyamide 6 and polyamide 6.6.

In one embodiment of the invention, the polyamide object susceptible to being polished with the method of the present invention is made with a polyamide selected from the group consisting of: polyamide 6, polyamide 6.6, polyamide 6.9, polyamide 6.10, polyamide 6.12, polyamide 4.6, polyamide 11, polyamide 12, and copolymers thereof; preferably, the polyamide is selected from the group consisting of: polyamide 6, polyamide 11, polyamide 12 and copolymers thereof.

In a particularly preferred embodiment, the polyamide object susceptible to be polished with the method of the present invention is made of polyamide 12.

For each type of polyamide, moreover, different variants may exist depending on the production process, the molecular weight or the presence of various additives, resulting in polyamides with different properties, for example, different degrees of crystallinity or different melting points, as it is well known to the skilled in the art. Some possible additives occasionally included in the polyamides are, for example, heat stabilizers, light stabilizers, flame retardants, plasticizers, lubricants or nucleating agents, among others. All these variations for each type of polyamide are considered encompassed within the scope of the present invention.

Polishing Method

The performed polishing with the method of the present invention, as is commonly understood in the art, refers to the elimination or reduction of the irregularities or roughness of the surface of the treated objects, in order to obtain an object with smooth and uniform surface.

The polishing of the object surface, according to the method of the present invention, is performed by immersing it in a mixture of formic acid and dichloromethane, at room temperature for a time period approximately comprised between 5 seconds and 6 minutes.

The effectiveness of the method of the invention can be verified by simple visual inspection and can also be quantified, for example, by measuring the decrease in the roughness of the surface after the treatment. Typically, the roughness can be measured by using a roughness tester, as is well known to the skilled in the art, and the value of the average roughness (Ra) of the surface is usually employed, expressed in microns, so that the efficacy of the treatment is evaluated by the decrease in the value of Ra after the treatment, more preferably, expressed as a percentage relative to the initial roughness, in order to be able to compare the effectiveness of different treatments, as described in Example 1.

As shown in the results of the tests included in Example 1, it is observed that, surprisingly, using a mixture of formic acid and dichloromethane in a volume ratio comprised between 1:10 and 3:1, the roughness of the surface of the polyamide objects obtained by additive manufacturing or 3D printing techniques is effectively reduced, without the need of using high temperatures in the process and with only a short period of treatment. According to this method, a decrease in the roughness of at least 30% is achieved and, in many of the conditions tested, the decrease in the roughness is above 40%, 50% or 60%, and up to the 73%.

Conversely, the treatment with each of the two solvents separately is ineffective, with a decrease of the roughness, at best, around the 15-17%, being the roughness of the object after the treatment still unacceptably high, of more than 10 μm. Thus, only when both solvents are mixed in the specified ratios an effective polishing of the surface of the object is obtained, which indicates a synergistic effect of this combination for the polishing of the surface, being the roughness lower, i.e. the object thus treated has a roughness lower than 7 μm, or lower than 5 μm or indeed lower than 4 μm, as it has been demonstrated in the data included in Table 1 below.

The results described in Example 1 also show that the mixture of solvents formic acid:acetic acid (1:1) described in the state-of-the-art for polishing nylon 12 objects according to a method which employed more drastic conditions of temperature and duration is, conversely, ineffective in the milder conditions of the present method.

Commercially available formic acid and dichloromethane are used to carry out the method of the present invention.

The commercially available formic acid used can contain a small proportion of water, and generally has a purity of more than 85%, preferably more than 90%, more preferably more than 95%, and still more preferably has a purity of approximately 99%, wherein the percentages are expressed by weight.

The volume ratio of formic acid:dichloromethane according to the method of the present invention is comprised between 1:10 and 3:1, preferably is comprised between 1:7 and 2:1, and still more preferably is comprised between 1:3 and 1:1.

In a particularly preferred embodiment of the invention, the ratio of formic acid:dichloromethane is approximately 1:3.

In another particularly preferred embodiment of the invention, the ratio of formic acid:dichloromethane is approximately 1:1.

In another particularly preferred embodiment of the invention, the ratio of formic acid:dichloromethane is approximately 1.7:1.

The treatment of the object with the solvent mixture is simple, typically, by simple immersion of the object in a container containing such mixture. Optionally, stirring may be added in order to achieve a greater homogeneity of the process, among others, magnetic stirring, gas stream bubbling and/or stirring by ultrasounds can be used.

The authors of the present invention have been further surprisingly found that a simultaneously treatment with ultrasounds can further improve the decrease of roughness.

Therefore, optionally, the method for polishing polyamide objects of the invention can be highly effective and improved when the object is immersed, at room temperature, in the formic acid and dichloromethane mixture for a period of time comprised between 5 seconds and 6 minutes, the ratio of formic acid:dichloromethane by volume being comprised between 1:10 and 3:1, and it is simultaneously treated with ultrasounds. By carrying out this additional ultrasound's treatment, the surface roughness can be decrease to a values lower than 3 µm or indeed lower than 2 µm, as it has been demonstrated in the data included in Tables 4 and 5 below.

The amount of the solvent mixture used is not critical, provided that it is enough to cover the object immersed therein.

The treatment according to the present invention is performed at room temperature, this is, at a temperature comprised between approximately 20° C. and 25° C.

The treatment according to the present invention is performed for a period of time comprised between approximately 5 seconds and 6 minutes, preferably comprised between approximately 10 seconds and 5 minutes.

In a particularly preferred embodiment of the invention, the ratio of formic acid:dichloromethane by volume is approximately 1:3 and the duration of the treatment is approximately 10 seconds.

In another particularly preferred embodiment of the invention, the ratio of formic acid:dichloromethane by volume is approximately 1:1 and the duration of the treatment is approximately 10 seconds.

In another particularly preferred embodiment of the invention, the ratio of formic acid:dichloromethane by volume is approximately 1.7:1 and the duration of the treatment is comprised between approximately 1 and 5 minutes.

Preferably, after treatment by immersion in the solvent mixture, the object is rinsed with water, this is, it is treated with water to help to remove any residual solvent from the surface. The rinsing with water can also be performed, for example, by immersion, for a period of time generally comprised between 1 and 10 minutes, preferably between 3 and 5 minutes. Alternatively, the rinsing with water can be performed by spraying water on the object.

Subsequently, the object is typically dried to remove any residual solvent or humidity from its surface. The drying is usually performed at a temperature comprised between 40° C. and 75° C., preferably comprised between 50° C. and 65° C., and still more preferably at a temperature of approximately 60° C., for a period of time usually comprised between 3 and 12 hours, preferably comprised between 5 and 8 hours.

Preferably the drying process is performed by heating and simultaneously applying vacuum to facilitate the drying of the object, preferably the object is dried at a pressure lower than 10 mbar.

This drying process can be optimally performed in a vacuum oven, which allows heating to the temperatures indicated above and, simultaneously, to apply vacuum during the process. The vacuum helps the dust inside the pores of the polyamide piece surface go out.

In an embodiment of the invention, the polishing process of the object can be performed simultaneously with a dyeing process, in order to advantageously obtain not only an object with a smooth surface, but also having the desired color, all with a single operation. For that purpose, a suitable dye can be dissolved in the same mixture of formic acid and dichloromethane used for polishing the piece, according to a one step process, performing the treatment under the same conditions of temperature and duration as specified above. Subsequently, the same additional steps of rinsing with water and drying can be performed in a similar manner as described above. The rinsing with water may be done repeatedly until the rinse waters do not appreciably show color.

According to this embodiment of the invention, the dye concentration in the solvent mixture is generally comprised between 1-5% (weight/volume, w/v), preferably is approximately 3% (w/v).

Alternatively, the dye can be applied after the polishing, according to a two-step process, so that after immersing the object in the mixture of formic acid:dichloromethane and, preferably, after rinsing with water, the object is immersed in an aqueous solution of the dye. The temperature of the aqueous solution of the dye is preferably comprised between 40° C. and 75° C., more preferably is of approximately 65° C., and the object remains immersed in this dyeing solution for a period of time comprised between 30 minutes and 4 hours, preferably comprised between 45 minutes and 3 hours, more preferably comprised between 1 hour and 2 hours.

According to this embodiment of the invention, the dye concentration in the aqueous solution is generally comprised between 1-5% (w/v), preferably is of approximately 3% (w/v).

Also, according to this embodiment of the invention, after the dying, the object is preferably rinsed with water, that is, it is treated with water to help to remove any residual solvent and unfixed dye from the surface of the treated piece. The rinsing with water can also be performed, for example, by immersion for a period of time generally comprised between 1 and 10 minutes, preferably between 3 and 5 minutes. Usually, this rinsing by immersion is repeated several times until the rinsing waters do not appreciably show color. Alternatively, the rinsing with water can be performed by spraying water on the object.

Afterwards, the object can be dried in the same conditions described above.

The dye used can be any dye suitable for dyeing polyamides, typically, acid dyes, which are anionic dyes soluble in water and which are generally also soluble in the mixture of formic acid and dichloromethane according to the present invention. Some not limiting examples of suitable dyes to be used in the present invention are Acid Yellow 4, 17, 23, 25, 34, 36, 73, 137, 199, 219, 230; Acid Blue 1, 7, 9, 25, 33, 37, 41, 56, 62, 80, 83, 90, 92, 113, 145, 158, 171, 185, 193, 205, 221, 260, 264, 281, 290 or 324; Acid Orange 3, 7, 10, 24, 26, 60, 80, 88 or 116; Acid Black 1, 2, 52, 60, 63, 94, 107, 131, 132, 172, 194, 210 or 234; Acid Red 1, 14, 17, 18, 52, 55, 73, 111, 114, 119, 131, 151, 183, 184, 213, 249, 266, 274, 299, 315, 337, 359, 360, 361 or 426; Acid Green 1, 25, 17, 28, 40, 48, 49 or 81; among others, and mixtures thereof.

Many acid dyes are commercially available from various suppliers, including, for example, the company Dystar under the trade name TELON®, or the company Huntsman under the trade names ERIONYL® and TECTILON®, or the company BASF under the name BASACID®, or the company Standard Colors under the name PERMALON®, among many others.

As shown in the examples, the method of the invention allows polishing effectively the surface of a polyamide object obtained by additive manufacturing or 3D printing techniques, under mild temperature conditions and using a short treatment period, and allows, additionally, dyeing the object during the same polishing process. Therefore, another aspect of the present invention is the object obtainable by the method of the invention.

Next, some tests carried out by the inventors are included, where the effectiveness of the method of the invention is shown. These specific examples given are intended to illustrate the present invention, but they are not to be construed as limiting it.

EXAMPLES

Example 1: Polishing According to the Method of the Invention and Comparative Tests Pieces of polyamide 12 prepared by SLS were polished, specifically, pieces made with PA2200 (Electro Optical System, EOS GmbH) were used. The sintering was performed in a tank with controlled atmosphere, which was heated to a temperature slightly below the melting point of the polyamide, and next the powder was sintered at the selected points with a $CO_2$ laser (30 W).

Different pieces of approximately the same size were subjected to the method of the invention, immersing them in a bath with the mixture of formic acid and dichloromethane, in different ratios and during different time periods, at a temperature of approximately 23° C. After each treatment, each of the pieces was immersed in a bath with distilled water for approximately 3 minutes, and then the pieces were dried in a vacuum oven at 60° C. for 8 hours.

The same piece was used for each solvent ratio tested, dividing it into 4 portions of approximately the same dimensions, one of which was used as blank (untreated portion), while the other 3 were treated during different time periods. Thus, for each formic acid:dichloromethane ratio tested, the following treatment times were also tested: 10 seconds, 1 minute and 5 minutes. The shape and dimensions of the treated pieces are shown in FIG. 1.

The roughness of the surface of the objects was measured, in the case of the blank without any polishing method, and the rest once the tested method was completed. Two measures of the roughness were made each time and the average value of the two measurements was taken. The decrease of the roughness achieved with each treatment, expressed as percentage of the initial roughness (blank) was calculated.

The results obtained are summarized in Table 1.

TABLE 1

Method of the invention: formic acid
(FA) - dichloromethane (DCM) mixture

| FA:DCM | Time | Average Ra (μm) | Decrease Ra (%) |
|---|---|---|---|
| 1:7 | Blank | 11.88 | — |
| | 10 s | 6.82 | 42.61 |
| | 1 min | 4.16 | 64.97 |
| | 5 min | 6.14 | 48.34 |
| 1:3 | blank | 11.00 | — |
| | 10 s | 7.33 | 33.36 |
| | 1 min | 4.51 | 59.05 |
| | 5 min | 3.33 | 69.73 |
| 1:1.67 | blank | 11.43 | — |
| | 10 s | 5.26 | 54.02 |
| | 1 min | 5.46 | 52.23 |
| | 5 min | 6.04 | 47.16 |
| 1:1 | blank | 12.59 | — |
| | 10 s | 3.38 | 73.14 |
| | 1 min | 3.76 | 70.12 |
| | 5 min | 7.21 | 42.71 |
| 1.67:1 | blank | 11.99 | — |
| | 10 s | 6.76 | 43.64 |
| | 1 min | 6.29 | 47.56 |
| | 5 min | 6.45 | 46.18 |

It is noted that the method of the invention allows remarkably reducing the roughness of the surface of the treated pieces, with reduction percentages of up to 73%.

The visual inspection of the treated objects denotes a smooth and uniform surface and with good texture.

For comparative purposes, a test was performed under the same conditions as described above, but using the following solvents: formic acid only, dichloromethane only and a mixture of formic acid:acetic acid in the ratio of 1:1 by volume.

The results obtained are shown in Table 2.

TABLE 2

Comparative methods

| Solvent | Time | Average Ra (μm) | Decrease Ra (%) |
|---|---|---|---|
| Formic acid | blank | 12.41 | — |
| | 10 s | 10.78 | 13.17 |
| | 1 min | 11.53 | 7.13 |
| | 5 min | 12.44 | −0.20 |
| Dichloromethane | blank | 11.66 | — |
| | 10 s | 9.65 | 17.24 |
| | 1 min | 10.82 | 7.25 |
| | 5 min | 11.62 | 0.34 |
| Formic acid:acetic acid (1:1) | blank | 12.22 | — |
| | 10 s | 10.28 | 15.88 |
| | 1 min | 12.05 | 1.39 |
| | 5 min | 12.41 | −1.56 |

It is noted that the use of the two solvents of the mixture of the invention separately, that is, formic acid or dichloromethane, did not produce satisfactory results, with percentages of reduction of the roughness clearly lower, and a visual appearance that did not denote any significant effect of the treatment.

Example 2: Simultaneous Polishing and Dyeing with the Method of the Invention Polyamide pieces prepared by SLS with PA2200, in the same way as described for Example 1, were polished and dyed simultaneously according to the method of the present invention.

For that purpose, a mixture of formic acid and dichloromethane was prepared in a volume ratio of 1:1, and in such mixture the dye Telon® Red AFG (Acid Red C.I.360) was dissolved in a concentration of 3% (w/v). The polyamide piece was immersed in such solution for 10 seconds at room temperature. Then, it was removed from the bath, rinsed by immersion in a bath of distilled water for approximately 3 minutes. The washing with water was repeated two more times, and then it was dried in a vacuum oven at 60° C. and 10 mbar pressure for between 8 and 10 hours. The obtained piece showed a smooth surface and had a homogeneous red coloring.

Similarly, another piece of the same material was dyed following an analogous procedure, but using a mixture of formic acid and dichloromethane in a volume ratio of 1:3. After the procedure, a remarkably smooth piece was also obtained and having a homogeneous red coloring.

Two other pieces of the same material were dyed following a two-step procedure. For this, each piece was first immersed for 10 seconds in a bath at 23° C. with the mixture of formic acid and dichloromethane in a ratio of 1:1 and 1:3, respectively, then the pieces were rinsed by immersion in a bath of distilled water, next they were immersed in solutions of Telon® Red AFG dye in water at 3% (w/v) at a temperature of 65° C. for one hour, subsequently the pieces were rinsed by immersing them in distilled water for 5 minutes, and finally both pieces were dried in a vacuum oven at 60° C. and 10 mbar for between 8 and 10 hours. Both pieces showed a smooth surface and a homogeneous red color.

Example 3: Ultrasound Application in the Polishing Treatment with the Method of the Invention Four polyamide samples composed by a "pipe" and a "nut" were made by MJF. Before performing the polishing treatment, surface roughness measurements were performed in order to be able to compare the variation of this parameter after the chemical polishing treatment.

The 4 samples, which are of similar dimensions, were subjected to the following treatment (as shown in the Table 3):

1. 2 samples (2 pipes and 2 nuts) were treated with the method for polishing according to the invention. Samples were immersed in a bath with a mixture of formic acid (AF) and dichloromethane (DCM) at different ratios (1:1 and 1:3) for 5 seconds at room temperature (23° C. approximately).

2. 2 samples (2 pipes and 2 nuts) were treated further with ultrasounds. Mixtures of formic acid and dichloromethane at different ratios (1:1 and 1:3) were prepared in a container. The container was introduced into an ultrasonic equipment containing a bath of distilled water. Upon activation of the ultrasounds (turn on the equipment), the samples were introduced into the container containing AF:DCM mixtures. The chemical polishing treatment is carried out simultaneously with ultrasounds for 5 seconds at room temperature (23° C. approximately).

After polishing treatment, each sample (piece of pipe and nut) was cleaned in a bath of distilled water for 3 minutes approximately and then, the pieces were dried in a vacuum oven at 60° C. for 8 hours.

TABLE 3

| Sample No | Mixture of solvents | Temperature (° C.) | Contact Time (s) | Interaction type | Drying |
|---|---|---|---|---|---|
| Pipe 1 & Nut 1 | AF/DCM 1:1 | Room temperature (r.t.) | 5 | Immersion | 60° C. overnight |
| Pipe 2 & Nut 2 | AF/DCM 1:1 | r.t. | 5 | Immersion & Ultrasounds | 60° C. overnight |
| Pipe 3 & Nut 3 | AF/DCM 1:3 | r.t. | 5 | Immersion | 60° C. overnight |
| Pipe 4 & Nut 4 | AF/DCM 1:3 | r.t. | 5 | Immersion & Ultrasounds | 60° C. overnight |

After drying the samples, the roughness was measured again at the same points as measured before treatment. The results obtained are summarized in the following tables:

TABLE 4

Invention method: Formic acid (AF) - dichloromethane (DCM)

| Experimental Conditions | Measurement position | Initial Ra (μm) | Final Ra (μm) | Ra Decrease (%) |
|---|---|---|---|---|
| Pipe 1 | Position 1 | 4.55 | 1.45 | 68.13 |
| AF/DCM 1:1 | Position 2 | 12.33 | 2.79 | 77.37 |
| Immersion | Position 3 | 11.69 | 3.05 | 73.91 |
| 5 seconds - room temperature | Position 4 | 12.35 | 1.94 | 84.29 |
| Pipe 2 | Position 1 | 5.69 | 4.17 | 26.71 |
| AF/DCM 1:1 | Position 2 | 12.72 | 2.37 | 81.37 |
| Immersion & Ultrasounds | Position 3 | 6.44 | 3.77 | 41.46 |
| 5 seconds - room temperature (continuation) | Position 4 | 14.69 | 2.65 | 81.96 |
| Pipe 3 | Position 1 | 6.74 | 2.58 | 61.72 |
| AF/DCM 1:3 | Position 2 | 10.61 | 1.66 | 84.35 |
| Immersion | Position 3 | 11.48 | 1.79 | 84.41 |
| 5 seconds - room temperature | Position 4 | 10.68 | 4.63 | 56.65 |
| Pipe 4 | Position 1 | 6.88 | 2.96 | 56.98 |
| AF/DCM 1:3 | Position 2 | 9.18 | 2.07 | 77.45 |
| Immersion & Ultrasounds | Position 3 | 8.88 | 1.78 | 79.95 |
| 5 seconds - room temperature | Position 4 | 11.83 | 1.35 | 88.59 |

TABLE 5

Invention method: Formic acid (AF) - dichloromethane (DCM)

| Experimental Conditions | Measurement position | Initial Ra (μm) | Final Ra (μm) | Ra Decrease (%) |
|---|---|---|---|---|
| Nut 1 | Position 1 | 11.91 | 4.63 | 61.13 |
| AF/DCM 1:1 | Position 2 | 21.47 | 7.15 | 66.70 |
| Immersion | Position 3 | 24.42 | 7.82 | 67.98 |
| 5 seconds - room temperature | Position 4 | 14.41 | 8.50 | 41.01 |
| | Position 5 | 24.18 | 3.85 | 84.08 |
| Nut 2 | Position 1 | 14.83 | 6.43 | 56.64 |
| AF/DCM 1:1 | Position 2 | 13.97 | 7.19 | 48.53 |
| Immersion & Ultrasounds | Position 3 | 14.38 | 6.23 | 56.68 |
| 5 seconds - room temperature | Position 4 | 12.61 | 11.49 | 8.88 |
| | Position 5 | 11.92 | 6.80 | 42.95 |
| Nut 3 | Position 1 | 17.84 | 9.57 | 46.36 |
| AF/DCM 1:3 | Position 2 | 20.51 | 10.39 | 49.34 |
| Immersion | Position 3 | 17.98 | 6.02 | 66.52 |
| 5 seconds - room temperature | Position 4 | 14.80 | 5.49 | 62.91 |
| | Position 5 | 13.31 | 16.64 | −25.02 |
| Nut 4 | Position 1 | 17.39 | 3.11 | 82.12 |
| AF/DCM 1:3 | Position 2 | 14.33 | 4.37 | 69.50 |
| Immersion & Ultrasounds | Position 3 | 11.89 | 3.41 | 71.32 |
| 5 seconds - room temperature | Position 4 | 16.18 | 6.55 | 59.52 |
| | Position 5 | 24.71 | 3.20 | 87.05 |

In the case of the pipe samples, a very similar behavior was observed between the immersion treatment of the pipe 1 and the immersion & ultrasounds of the pipe 4, then both treatments significantly reduce the surface roughness of the polyamide samples.

In case of the nuts samples, the initial surface roughness is much higher and more differences in the final roughness were observed being the treatment for the nut 4 (AF/DCM 1:3, Immersion & Ultrasounds, 5 seconds, room temperature) the most effective in terms of roughness decrease. It was observed that in the simultaneous treatment with ultrasounds, the surface roughness of the treated nut was significantly reduced with reduction percentages up to 87%.

The invention claimed is:

1. A method for polishing the surface of a polyamide object obtained by additive manufacturing or 3D printing techniques, said method comprising the step of:
    immersing the object in a mixture of formic acid with dichloromethane at room temperature for a period of time ranging from about 5 seconds to about 6 minutes, wherein the ratio of formic acid:dichloromethane by volume ranges from about 1:10 to about 3:1.

2. The method of claim 1, wherein the object is obtained by Selective Laser Sintering (SLS).

3. The method according to claim 1, wherein the object is made with a polyamide selected from the group consisting of: polyamide 6, polyamide 6.6, polyamide 6.9, polyamide 6.10, polyamide 6.12, polyamide 4.6, polyamide 11, polyamide 12, and copolymers thereof.

4. The method of claim 3, wherein the object is made of polyamide 12.

5. The method of claim 1, wherein the ratio of formic acid:dichloromethane by volume is comprised between 1:7 and 2:1.

6. The method of claim 1, wherein the object is subsequently rinsed with water.

7. The method of claim 1, wherein the object is subsequently dried at a temperature ranging from about 40° C. to about 75° C. for a period of time temperature ranging from about 3 to about 12 hours.

8. The method of claim 7, wherein the drying is performed applying vacuum.

9. The method of claim 1, wherein a dye is dissolved in the mixture of formic acid and dichloromethane for simultaneously polishing and dyeing the object.

10. The method of claim 9, wherein the dye concentration in the mixture of formic acid and dichloromethane ranges from about 1% (w/v) to about 5% (w/v).

11. The method claim 1, wherein subsequently the object is treated with a dye aqueous solution at a temperature ranging from about 40° C. to about 75° C. for a period of time ranging from about 30 minutes to about 4 hours.

12. The method of claim 11, wherein the dye concentration in the aqueous solution ranges from about 1% (w/v) to about 5% (w/v).

13. The method of claim 11, wherein the object is subsequently dried at a temperature ranging from about 40° C. to about 75° C. for a period of time ranging from about 3 to about 12 hours.

14. The method of claim 9, wherein the dye is an acid dye.

15. The method of claim 1, wherein the method further comprises the step of applying ultrasounds.

* * * * *